Figure 1:
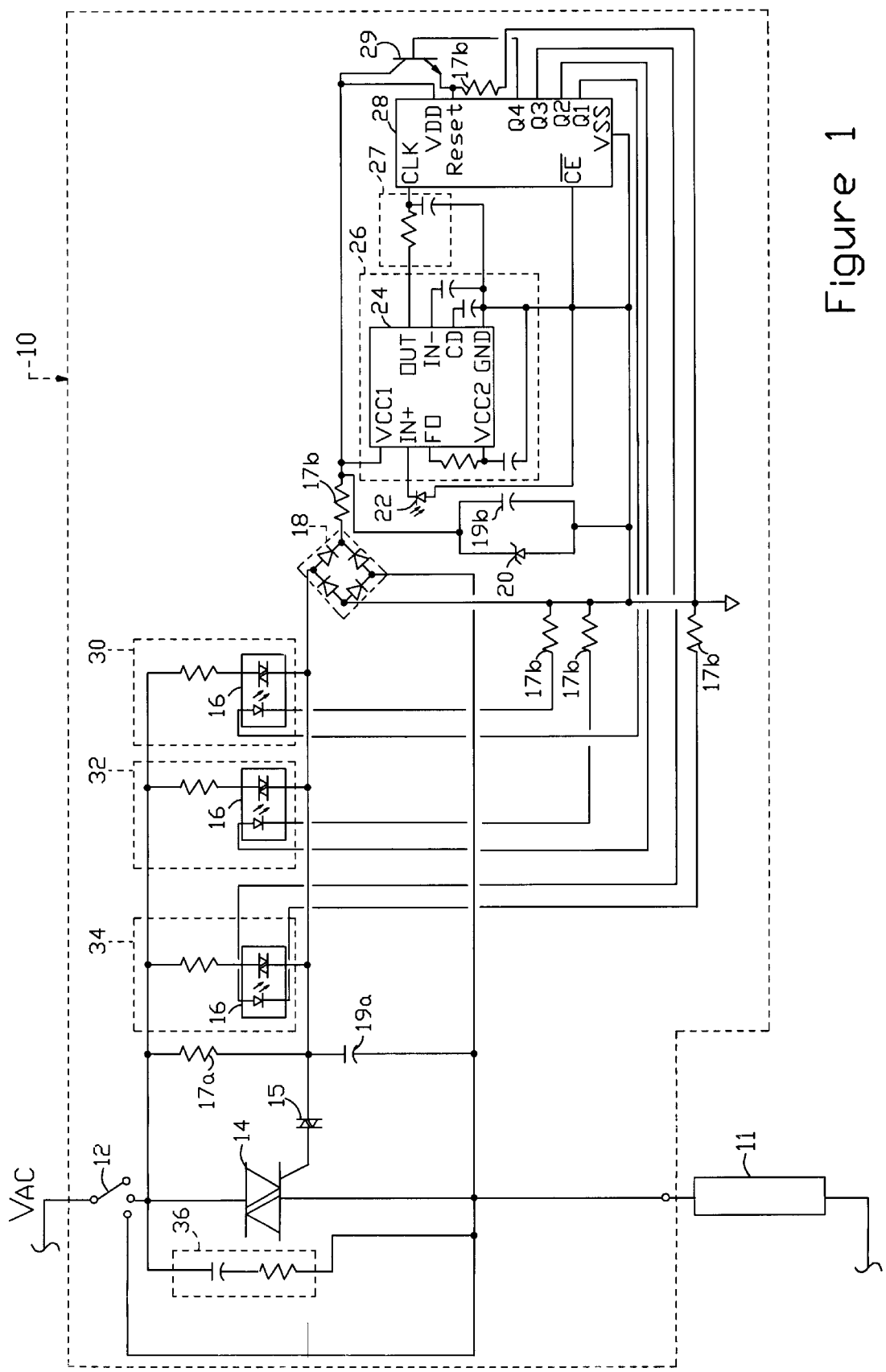

United States Patent [19]
Moore

[11] Patent Number: 5,977,882
[45] Date of Patent: Nov. 2, 1999

[54] INFRARED REMOTE CONTROLLED IN-LINE POWER SWITCH

[76] Inventor: Clayton K. Moore, 1300 Lucaya Ave., Venica, Fla. 34292

[21] Appl. No.: 08/518,078

[22] Filed: Aug. 22, 1995

[51] Int. Cl.⁶ .............................. H01H 47/00; H04Q 9/16; H04Q 7/02
[52] U.S. Cl. ............................... 340/825.72; 340/825.69; 340/825.57; 307/116; 307/125; 307/139; 307/112; 315/149; 315/291; 315/194; 323/318
[58] Field of Search ......................... 340/825.72, 825.69, 340/825.22, 825.57; 307/115, 116, 125, 139, 140, 141.8, 112–3; 359/142, 145–8; 323/318; 315/149, 291, 297, 194, 292, 4, 316

[56] References Cited

U.S. PATENT DOCUMENTS

| Re. 33,504 | 12/1990 | Yuhasz et al. | 307/115 |
|---|---|---|---|
| 3,746,923 | 7/1973 | Spira et al. | 315/291 |
| 3,824,428 | 7/1974 | Spira et al. | 315/105 |
| 3,927,345 | 12/1975 | Licata et al. | 315/DIG. 5 |
| 5,047,765 | 9/1991 | Munekata | 340/825.51 |
| 5,189,412 | 2/1993 | Mehta et al. | 340/825.22 |
| 5,239,205 | 8/1993 | Hoffman et al. | 307/117 |

*Primary Examiner*—Michael Horabik
*Assistant Examiner*—Yonel Beaulieu

[57] ABSTRACT

A switch (10) utilizes an infrared detector (22) that can be operated by existing wireless television or stereo remote control transmitters. Output from a triac (14) of a switch (10) to a load (11) can be varied remotely. In addition, a variety of load (11) types and ratings can be controlled.

2 Claims, 1 Drawing Sheet

INFRARED REMOTE CONTROLLED IN-LINE POWER SWITCH

BACKGROUND

1. Field of the Invention

This invention relates to electrical switches, specifically to an improved remote control for an in-line switch.

2. Discussion of Prior Art

Originally in-line or series electrical switches connected between the power source and the load, switching what is considered the HOT wire in a single phase Alternating Current (AC) circuit, operated by manually moving the switch position to either ON or OFF. These standard electrical wall switches were commonly of a two-wire type. Once the series switch was in the ON position, an effective short-circuit was created in series between the source and the load. Only the states of ON or OFF were possible.

Dimmer circuits implemented varying the voltage output to the load. U.S. Pat. No. 3,746,923 to Spira et al. (1973) discloses an in-line light dimmer switch with no remote control. Physically touching the switch still has to occur to cause dimming, or ON or OFF operations. Also, these circuits were still considered to be effectively a short-circuit with small power potential across the switch when operating ON or dimming. The problem of deriving power from these circuits for control, once they were effectively appearing as a short-circuit, was unanswered. Furthermore, the advantage of wireless remote control for these two-wire, in-line switches was not appreciated.

U.S. Pat. No. 3,824,428 to Spira et al. (1974) and U.S. Pat. No. 3,927,345 to Licata et al. (1975) describe fluorescent lighting circuits with the control in parallel and not series with the load. No derived power source for control of an in-line switch, or remote operation is disclosed.

Thereafter, U.S. Pat. No. 5,239,205 to Hoffman et al. (1993) discloses a radio frequency (RF) remote controlled in-line light switch; however, this switch having a multitude of components is complex, expensive, and has only an ON or OFF position. It is not effective in varying the voltage output and thus dimming the light. Hoffman et al. is further restricted in that it limits the power handling capacity of the switch, and can only supply resistive loads such as incandescent lights. Another disadvantage of Hoffman et al. is that the receiver or detector in conjunction with a special, matching transmitter must be set to the same frequency or wavelength for operation.

The problem of a simple, effective, remote control for an in-line, two-wire switch remains unaddressed.

No in-line or series switch is described which derives power for control while not having the load limit the switch capacity. No series switch is disclosed which can, through wireless remote control, vary the voltage output to the load.

Finally, no switch is disclosed which does not have to have a matching wavelength signal between the transmitter and receiver for operation, or which does not have to interpret an actuating signal.

OBJECTS AND ADVANTAGES

Accordingly, several objects and advantages of my invention are:

(a) to provide a series switch which will derive power for control without the capacity being limited by the load;

(b) to provide a power switch with a wireless infrared remote controlled receiver or detector;

(c) to provide a remote controlled in-line two-wire switch which can be used for impedance loads;

(d) to provide an inexpensive remote controlled switch with few parts;

(e) to provide a switch which can be operated over a band or plurality of wavelengths;

(f) to provide a switch which can be operated remotely without the necessity of a particular frequency matching transmitter;

(g) to provide a fast switch which utilizes existing wireless infrared transmitters designed to operate other equipment such as televisions, video cassette recorders (VCRs), or stereos;

(h) to provide an in-line switch which can be remotely and wirelessly controlled to vary a output from a switch to a load; and (i) to provide a remote controlled switch which can be actuated from a plurality of transmitted signals.

Further objects and advantages of my invention will become apparent from a consideration of the drawing and ensuing description.

DRAWING FIGURES

FIG. 1 shows a detailed electronic connection diagram.

Reference Numerals In Drawing

| | |
|---|---|
| 10 switch | 20 zener diode |
| 11 load | 22 detector |
| 12 mechanical position switch | 24 preamplifier |
| 14 triac | 26 preamplifier circuit |
| 15 diac | 27 RC filter |
| 16 optically isolated triac driver | 28 counter |
| 17a resistor | 29 transistor |
| 17b resistor | 30 resistor-triac circuit |
| 18 rectifier | 32 resistor-triac circuit |
| 19a capacitor | 34 resistor-triac circuit |
| 19b capacitor | 36 RC snubber circuit |

SUMMARY

The invention provides an in-line switch with wireless infrared remote control capability. The remote control can vary the output to the load and can be used with a plurality of existing infrared transmitters.

DESCRIPTION

A typical embodiment of the in-line switch of the present invention is illustrated in FIG. 1. An AC supply is connected to a switch 10 which is connected to a load 11 either directly or through an AC outlet. An advantage is that load 11 can be a purely resistive or impedance type load, such as a light or fan, respectively.

The power line to switch 10 is connected to a mechanical switch 12 which can be maintained in any one of three positions, such as ON, REMOTE, or OFF position. Mechanical switch 12 in the ON position connects directly to load 11. Mechanical switch 12 in the REMOTE position connects to a power switching device or triac 14, which can have various power ratings, as well as a resistor 17a, and resistor-triac circuits 30, 32, and 34. Load 11 side of triac 14 connects to a capacitor 19a, and a rectifier 18. A resistor-capacitor (RC) snubber circuit 36, which is added for inductive loads, also connects mechanical switch 12 to load 11.

The firing or gating terminal of triac 14 is connected to a low voltage control device, triggering device, or diac 15 which connects to resistor 17a, capacitor 19a, and optically isolated triac drivers 16 which connect to respective resistors in resistor-triac circuits 30, 32, and 34. Optically isolated triac drivers 16, resistor 17a, and capacitor 19a connect to rectifier 18 providing reliable control power.

Rectifier 18 supplies low power electronic devices and connects through a limiting resistor 17b to a capacitor 19b, a clipping or zener diode 20, a preamplifying means or preamplifying circuit 26, a electronic stage valve or counter 28, and a controllable electron valve or transistor 29. A receiver, converter, or infrared detector 22, capable of detecting over a range of wavelengths and not just a particular wavelength, is connected to preamplifier 24 which connects to preamplifying circuit 26.

Preamplifier 24 connects to a filter or RC filter 27 which is connected to a counter 28. Counter 28 connects to a resistor 17b and a transistor 29. Counter 28 also connects to optically isolated triac drivers 16 through respective limiting resistors 17b to rectifier 18.

From the description above, a number of advantages of my infrared controlled in-line switch become evident:

(a) A reliable self-derived means of power of an in-line switch is used to supply a control means.

(b) A power switching device is not load limiting.

(c) Various types of loads can be supplied, not just resistive.

(d) Low power devices and power consumption are possible for control.

(e) Generic detection is accomplished over a range of wavelengths and is not limited to a particular wavelength.

(f) With the use of a small number of components, an inexpensive, new generation of in-line remote controlled switch with advanced capability, and operating at the speed of light is distinguished.

OPERATION

Power is supplied across switch 10 which is wired in series with load 11. RC snubber circuit 36 is attached across triac 14 for reducing higher frequency effects associated with an impedance type load 11. If load 11 is not inductive, RC snubber circuit 36 can be removed.

Mechanical switch 12 can manually be placed in a) a OFF position disconnecting all power through switch 10; b) a ON position feeding load 11 and bypassing the electronics of switch 10; or c) a REMOTE position.

When in the REMOTE position, by varying the firing angle to the gate of triac 14, a voltage output to load 11 can be varied. By varying a output to load 11, if load 11 were of a lighting type, the light could be dimmed. If it were an appliance or fan, the speed could be changed, and so on.

The firing angle is changed by varying the values of a RC network, comprised of resistor 17a and capacitor 19a relative locations. To accomplish this, in the FIG. 1 embodiment respective resistors of resistor-triac circuits 30, 32, 34, are switched in or out of the circuit by optically isolated triac drivers 16 being energized or deenergized from the output of counter 28 changing states and thereby changing the resistance of the RC network. Changing the value of comparable capacitors connected across capacitor 19a in a similar manner would also produce this result.

The power derived from rectifier 18, shown in FIG. 1 as a full-wave rectifier but which could also be a half-wave rectifier, or other direct current (DC) supply, feeds the selected group of low power consuming DC electronic components, including, but not limited to TTL and/or CMOS.

Capacitor 19b being fed from rectifier 18 stores energy and is used to help filter the DC supply or source.

Zener diode 20 across rectifier 18 limits DC overvoltage potential.

When mechanical switch 12 is in a REMOTE position and switch 10 is in the OFF state, detector 22 detects an input signal within a range of infrared wavelengths such as those commonly produced by, but not limited to, pressing any of a plurality of buttons on existing wireless television, VCR, or stereo remote control transmitters. Detector 22 utilizes preamplifier circuit 26 in lieu of stand-alone infrared detection to significantly increase the distance of operation from more than a few meters between a remote transmitter and switch 10. Detector 22 also achieves wide-angle signal reception.

After detector 22 receives an initial signal and inputs it to preamplifier circuit 26, it is modified by preamplifier 24 and output through RC filter 26 to convert a plurality of pulse signals to a clock pulse signal which initiates counter 28. Counter 28 then outputs a signal to optically isolated triac driver 16 which switches in resistance of resistor-triac circuit 30, sufficiently gating triac 14, turning it ON and energizing load 11.

A remote transmitter is again activated sending another signal to detector 24, outputting from detector 22 a next signal through preamplifying circuit 26 and RC filter 27 to counter 28, incrementing counter 28. Counter 28 outputs a signal to a next stage optically isolated triac driver 16. Optically isolated triac driver 16 upon receiving this signal switches in its associated resistor, shown in resistor-triac circuit 32 in the preferred embodiment of FIG. 1, to alter the firing angle to triac 14 and thus vary a voltage output with its associated effects to load 11. This operation is repeated for a next stage resistor-triac circuit 34.

The number of counter 28 and optically isolated triac driver 16 stages could be increased to provide wider variations in voltage output or could be decreased to provide less, including elimination of all, except in this embodiment optically isolated triac driver 16 in resistor-triac circuit 30 which effectively turns ON triac 14. A plurality of output levels is achieved by sequentially switching in the next stage and switching out the previous stage of resistor-triac circuits 30, 32, 34, etc., to select a desired output level of triac 14. Only one resistor-triac circuit 30, 32, or 34, is energized at a time thereby requiring less power than if additive or combinational resistor-triac circuits 30, 32, 34, or similar capacitor circuits were utilized to alter the firing angle. Depending on the type of load 11 this then offers a different output level for each stage of a resistor-triac circuit 30, 32, 34, and thereby accomplishes switching to a plurality of distinct light levels or speeds, etc., in stages.

In the preferred embodiment of FIG. 1, a transmitter activated final signal is received by detector 22, detector 22 then sends a signal through preamplifier 24 and RC filter 27 to counter 28 causing a final stage to signal transistor 29 to conduct. Transistor 29 conducts, changing a digital voltage level to counter 28 and resetting the device. Resetting counter 28 turns OFF currently energized optically isolated triac driver 16, switching respective resistance out of the circuit, removing the adequate gate signal and turning OFF triac 14, deenergizing load 11. Switch 10 is now ready to be turned ON again.

Thus, lights, appliances, and other equipment can be remotely turned ON, OFF, or also have a output supply which feeds these loads varied.

CONCLUSION, RAMIFICATIONS, AND SCOPE

Accordingly, the reader will see that the sophisticated in-line switch of this invention can be used for reliable wireless remote control. Not only is no other power source necessary for this economical device, as it derives its power in the REMOTE position whether the in-line switch is energizing the load or not, but it also does not limit the load capacity of the switch. Specifically, the application to vary the power to the load is immediately useful for lights, fans, appliances, etc.

Furthermore, the simple switch has the additional advantages in that:

- it provides a series switch which derives power for control without limiting the capacity to feed a load;
- it provides a power switch with a wireless infrared remote controlled receiver;
- it provides a in-line remote controlled switch which can be used for impedance loads;
- it provides an inexpensive remote controlled switch with few parts;
- it provides a switch which can operate from a variety of AC power supply voltages, currents, and frequencies;
- it provides a remote controlled switch which can be operated over a band, range, or plurality of wavelengths;
- it provides a switch which can be operated remotely without the necessity of a particular frequency matching transmitter;
- it provides a switch which utilizes existing infrared transmitters designed to operate other equipment such as televisions or stereos;
- it provides a remote controlled switch which can be actuated from a plurality of transmitted signals; and
- it provides a two-wire switch which can be remotely controlled to vary a output over a plurality of levels from a switch to a load.

Although the description above contains many specificities, these should not be construed as limiting the scope of the invention but as merely providing an illustration of the presently preferred embodiment of this invention. For example, the switch can have other configurations such as the conversion of utilizing capacitors in stages, or the control circuit could only have the ON or OFF stage for REMOTE operation for loads not requiring varied output, a transformer could be added to additionally isolate the control circuitry, or a potentiometer could be utilized and thus add manual dimming control, etc.

Depending upon the type of detector, preamplifying circuit 26 could be incorporated in the detector or eventually eliminated and still maintain the longer operational distances achieved in the preferred embodiment. Other components which could also be removed include the RC snubber circuit for inductive loads, multiple RC network altering resistor-triac circuits, multiple counter stages, diodes, resistors, etc.

Alternative embodiments which produce a like effect could include, but are not limited to, using controllable electron valves, silicon-controlled-rectifiers (SCRs), operational amplifying valves, microprocessor means, transistors, diacs, silicon control switches (SCSs, STSs, etc.), integrated circuits, logic devices, including replacing the triac, and/or relays, or similar devices individually or in combination. Well-known inductor-capacitor (LC) circuitry for filtering or suppression of RFI, etc., could be added in a usual manner, and/or a metal oxide varistor could be connected across triac 14 to provide protection against damaging transients.

Thus the scope of the invention should be determined by the appended claims and their legal equivalents, rather than by the example given.

I claim:

1. A method of controlling an electrical power switch connected in series with a load and connected to a single inclusive electronic control comprising:

transmitting infrared signals from a remote control transmitter designed to operate other equipment;

receiving said infrared signals at a receiving means of said switch;

amplifying and filtering said received infrared signals in order to convert said infrared signals into a clock pulse signal;

altering a staging means with each clock pulse signal; and driving at least one of a plurality of electron valve circuits in order to vary said load based on an output of said staging means.

2. An in-line electrical switch comprising:

a. A means for receiving infrared signals from a remote control transmitter designed to operate other equipment;

b. means for amplifying said received infrared signals;

c. means for filtering said amplified signals in order to convert said infrared signals into a clock pulse signal;

d. means for altering staging from each clock pulse signal; and e. means for controlling an output produced by said switch, being singly self-powered from an alternating current (AC) power supply, feeding at least one of a plurality of impedance and power rated loads by said switch based on an output of said staging means.

* * * * *